United States Patent
Yokoyama et al.

(10) Patent No.: US 10,632,847 B2
(45) Date of Patent: Apr. 28, 2020

(54) VEHICLE BATTERY PACK PROTECTIVE STRUCTURE AND VEHICLE HAVING THE VEHICLE BATTERY PACK PROTECTIVE STRUCTURE

(71) Applicant: SUBARU CORPORATION, Tokyo (JP)

(72) Inventors: Yutaka Yokoyama, Tokyo (JP); Kota Saito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/179,556

(22) Filed: Nov. 2, 2018

(65) Prior Publication Data
US 2019/0184831 A1    Jun. 20, 2019

(30) Foreign Application Priority Data
Dec. 20, 2017    (JP) ................. 2017-244080

(51) Int. Cl.
| | |
|---|---|
| *B60L 3/00* | (2019.01) |
| *B60K 1/04* | (2019.01) |
| *B62D 25/08* | (2006.01) |
| *H01M 2/10* | (2006.01) |
| *B62D 21/15* | (2006.01) |

(Continued)

(52) U.S. Cl.
CPC ............ *B60L 3/0007* (2013.01); *B60K 1/04* (2013.01); *B60L 50/66* (2019.02); *B62D 21/15* (2013.01); *B62D 21/152* (2013.01); *B62D 25/08* (2013.01); *B62D 25/087* (2013.01); *H01M 2/1083* (2013.01); *B60K 6/28* (2013.01); *B60K 2001/0416* (2013.01); *B60K 2001/0438* (2013.01); *B60Y 2200/91* (2013.01); *B60Y 2200/92* (2013.01); *B60Y 2306/01* (2013.01)

(58) Field of Classification Search
CPC ......... B60L 3/0007; B62D 21/15; B60K 1/04; H01M 2/1083; B60Y 2200/91
See application file for complete search history.

(56) References Cited

U.S. PATENT DOCUMENTS

| | | | |
|---|---|---|---|
| 2009/0021052 A1 | 1/2009 | Kato | |
| 2018/0105209 A1* | 4/2018 | Fees | ........................ B60K 1/04 |

FOREIGN PATENT DOCUMENTS

| | | |
|---|---|---|
| JP | H 09-240288 A | 9/1997 |
| JP | 2009-23383 A | 2/2009 |
| JP | 2013-14312 A | 1/2013 |

(Continued)

OTHER PUBLICATIONS

Japanese Office Action, dated Sep. 3, 2019, in Japanese Application No. 2017-244080 and English Translation thereof.

*Primary Examiner* — Erez Gurari
(74) *Attorney, Agent, or Firm* — McGinn I. P. Law Group, PLLC.

(57) ABSTRACT

There is provided a vehicle battery pack protective structure which protects a vehicle battery pack including battery stacks disposed in a width direction of a vehicle. The structure includes: a battery pack storage container that stores the vehicle battery pack; and a first upper reinforcing member that extends in a front-rear direction of the vehicle between the battery stacks, and is connected to the battery pack storage container at a front end and a rear end. A first fragile part is formed below an intermediate position of the first the upper reinforcing member.

18 Claims, 5 Drawing Sheets

(51) Int. Cl.
 *B60L 50/60* (2019.01)
 *B60K 6/28* (2007.10)

(56) References Cited

FOREIGN PATENT DOCUMENTS

| | | | |
|---|---|---|---|
| JP | 2016-185739 A | 10/2016 |
| JP | 2017-121871 A | 7/2017 |
| KR | 2013-0106484 A | 9/2013 |

* cited by examiner

VEHICLE BATTERY PACK PROTECTIVE STRUCTURE AND VEHICLE HAVING THE VEHICLE BATTERY PACK PROTECTIVE STRUCTURE

CROSS-REFERENCE TO RELATED APPLICATIONS

The present application claims priority from Japanese Patent Application No. 2017-244080 filed on Dec. 20, 2017, the entire contents of which are hereby incorporated by reference.

BACKGROUND

1. Technical Field

The present invention relates to a vehicle battery pack protective structure and a vehicle having the structure, particularly to a vehicle battery pack protective structure capable of effectively protecting a vehicle battery pack even when a vehicle collides and to the vehicle having the structure.

2. Related Art

In electric vehicles and hybrid vehicles, a high-capacity vehicle battery is mounted, which supplies electric power to a motor for rotating the motor that provides driving force to the vehicle.

In order to ensure a sufficient continuous mileage, the vehicle battery has a heavy weight and also a large volume. For this reason, the vehicle battery is disposed under the seats or the rear floor, for instance.

Japanese Unexamined Patent Application Publication (JP-A) No. 9-240288 describes a battery frame structure that improves mounting stability and noise performance of the battery in such an electric vehicle. Specifically, the battery is surrounded by outer frames, and a portal bridge frame is formed to stand over the outer frames which are opposed to each other. The formation of the bridge frame having such a shape allows a load to be distributed to the outer frames, and thus warping and deformation of the base plate which supports the battery is avoided.

SUMMARY OF THE INVENTION

An aspect of the present invention provides a vehicle battery pack protective structure which protects a vehicle battery pack including a plurality of battery stacks disposed in a width direction of a vehicle, the structure including: a battery pack storage container that stores the vehicle battery pack; and a first upper reinforcing member that extends in a front-rear direction of the vehicle between the battery stacks, and is connected to the battery pack storage container at a front end and a rear end. A first fragile part is formed below an intermediate position of the first the upper reinforcing member.

BRIEF DESCRIPTION OF THE DRAWINGS

FIG. 4A is a perspective view illustrating reinforcement members, and FIG. 4B is an exploded perspective view illustrating the reinforcement members.

DETAILED DESCRIPTION

In the technique described in JP-A No. 9-240288, a bridge frame is disposed to reinforce the battery frame structure. However, the bridge frame is disposed for the purpose of distributing a load, thus the mechanical strength of the bridge frame is not so significant. Also, the bridge frame is an elongated member extending in the width direction of the vehicle. Thus, for instance, when an impact is applied in a front-rear direction of the vehicle, it is not possible to reduce the impact by the bridge frame.

Thus, when a collision from the rear occurs in an electric vehicle or the like, it is not possible to effectively absorb the collision energy by the battery frame, and thus the battery may not be sufficiently protected.

The present invention has been devised in consideration of such a problem, and it is desirable to provide a vehicle battery pack protective structure capable of protecting a vehicle battery pack even when a collision or the like occurs, and to provide a vehicle having the structure.

Hereinafter, a vehicle battery pack protective structure 21 and a vehicle 10 having the structure 21 according to the example will be described with reference to the drawings. In the following description, the upper, lower, front, rear, right, and left directions are used as needed, and the right and left indicate the directions relative to the traveling direction of the vehicle 10.

Figure 1:
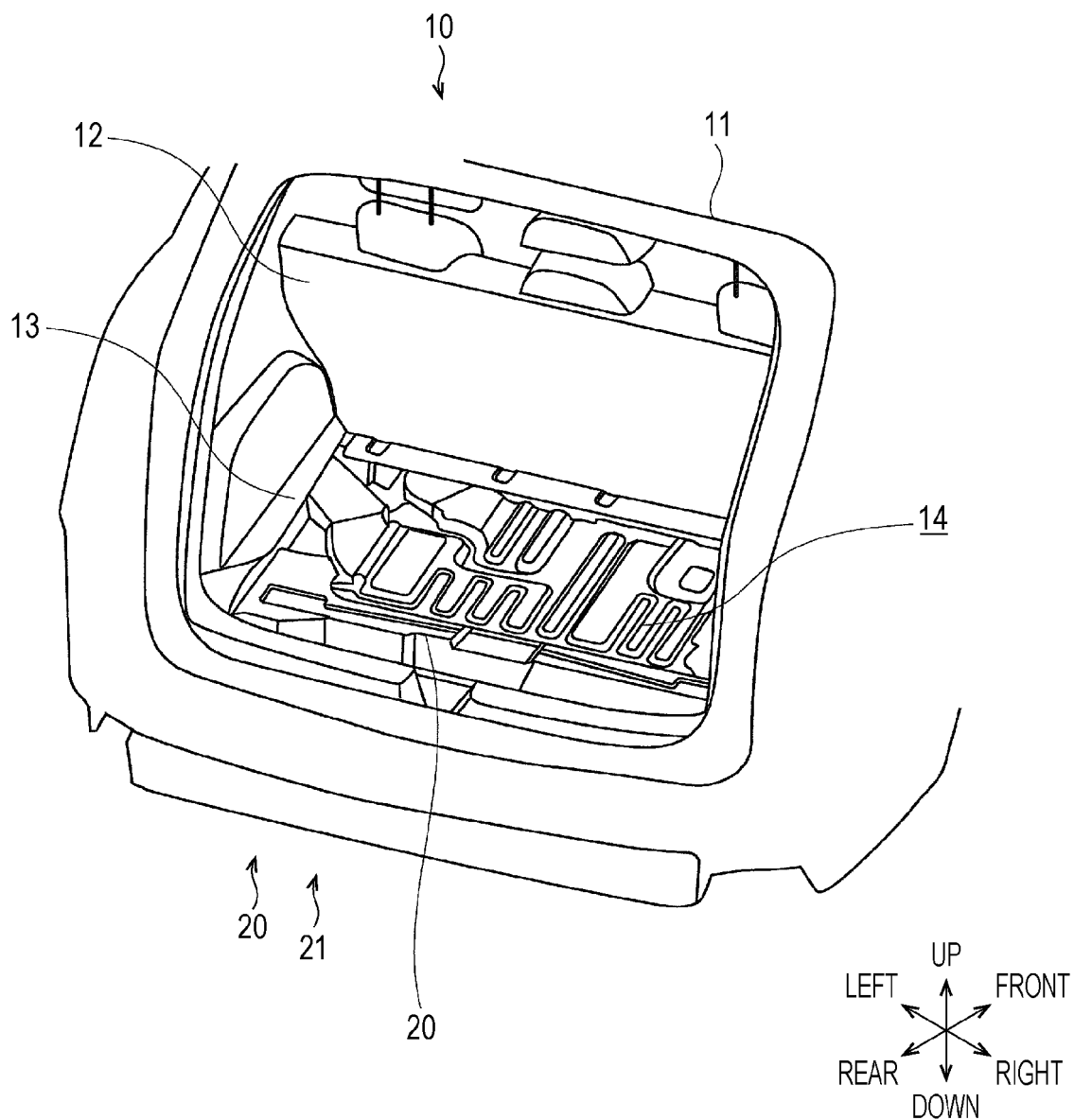
FIG. 1 is a perspective view illustrating a vehicle having a vehicle battery pack protective structure according to an example of the present invention.

FIG. 1 is a perspective rear view, seen from an upper position, of the vehicle 10 having the vehicle battery pack protective structure 21. Here, a rear gate, which covers the rear end of a vehicle body 11 of the vehicle 10, is omitted in the illustration. The vehicle 10 is, for instance, a hybrid vehicle including a motor and an engine as the driving source or an electric vehicle including only a motor as the driving source.

A rear seat 12 is disposed at the rear of the vehicle cabin of the vehicle body 11, and a rear floor 13 is disposed rearwardly of the rear seat 12. A storage space 14 is formed under the rear floor 13, and a vehicle battery pack 20 and the vehicle battery pack protective structure 21 are disposed inside the storage space 14. Here, the vehicle battery pack 20 and the vehicle battery pack protective structure 21 are covered with a cover.

Figure 2:
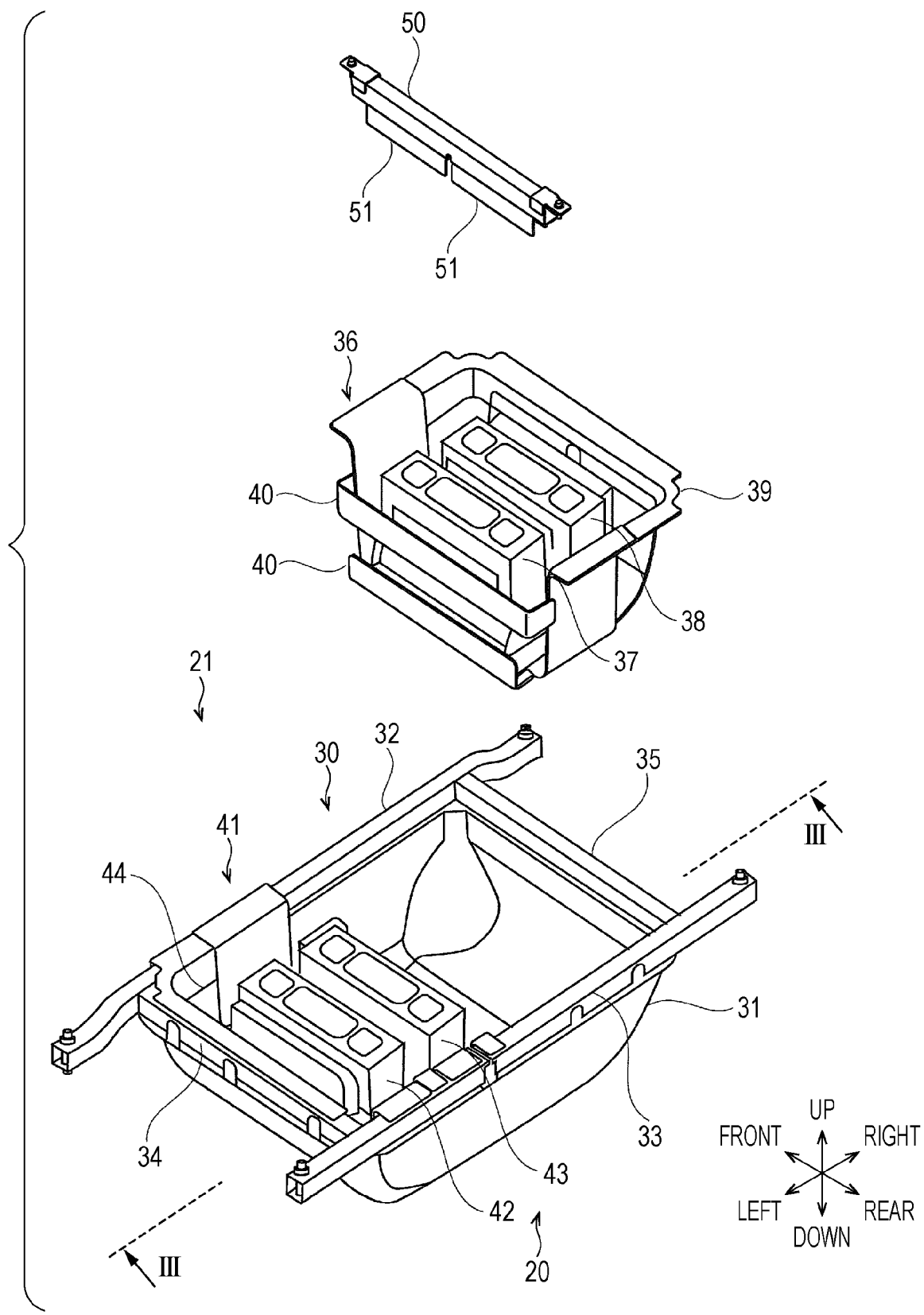
FIG. 2 is an exploded perspective view illustrating the vehicle battery pack protective structure according to the example of the present invention.

The vehicle battery pack protective structure 21 will be described with reference to FIG. 2. Here, the members included in the vehicle battery pack protective structure 21 are separated in the upper-lower direction and illustrated.

The vehicle battery pack protective structure 21 is for protecting the vehicle battery pack 20 including multiple battery stacks 37. Also, the vehicle battery pack protective structure 21 includes a battery pack storage container 30 in which the vehicle battery pack 20 is stored, and a first upper reinforcing member 50. As described later, the first upper reinforcing member 50 is an elongated member extending in the front-rear direction of the vehicle 10 between the battery stacks 37, and the front end and the rear end of the first upper reinforcing member 50 are connected to the battery pack storage container 30.

The battery pack storage container 30 includes a storage container 31 that stores the vehicle battery pack 20, and frames that support the periphery of the storage container 31. The storage container 31 is obtained by molding a steel plate made of iron or aluminum or a synthetic resin plate into a substantially box shape, has dimensions for storing the vehicle battery pack 20, and has an elongated rectangular shape in the right-left direction in a top view. A front reinforcement frame 32 is connected to the front side of the storage container 31, a rear reinforcement frame 33 is connected to the rear side of the storage container 31, a left reinforcement frame 34 is connected to the left side of the storage container 31, and a right reinforcement frame 35 is connected to the right side of the storage container 31. Each frame such as the front reinforcement frame 32 is, for instance, a steel elongated member having a closed cross-section, such as a rectangular steel pipe.

The outer ends of the front reinforcement frame 32 and the rear reinforcement frame 33 in the right-left direction extend outwardly more than the outer ends of the storage container 31 in the right-left direction. The outer ends of the front reinforcement frame 32 and the rear reinforcement frame 33 in the right-left direction are connected to the vehicle body 11 described above.

The front ends of the left reinforcement frame 34 and the right reinforcement frame 35 are each connected to an intermediate position of the front reinforcement frame 32. The rear ends of the left reinforcement frame 34 and the right reinforcement frame 35 are each connected to an intermediate position of the rear reinforcement frame 33.

The vehicle battery pack 20 stored in the storage container 31 described above includes a battery module 36 disposed on the right side and a battery module 41 disposed on the left side. Here, the battery module 36 on the right side is separated above from the battery pack storage container 30 and illustrated. The battery modules 36, 41 are stored in the storage container 31 in an outfitting process in the manufacturing process of the vehicle 10.

In the battery module 36, the battery stack 37 and the battery stack 38 are arranged in the right-left direction. The battery stack 37 and the battery stack 38 are stored in a substantially box-shaped module container 39. At the left end of the module container 39, a protective plate 40 is mounted in the left-side opening of the module container 39, the protective plate 40 being made of a strip-shaped steel plate on which bending processing has been performed. Here, two protective plates 40 are mounted. Thus, the left side of the battery stack 37 can be protected by the protective plate 40.

Similarly, in the battery module 41, the battery stack 42 and the battery stack 43 are arranged in the right-left direction. The battery stack 42 and the battery stack 43 are stored in a substantially box-shaped module container 44. Similarly, at the right side of the module container 44, a protective plate 45 protects the battery stack 43. Here, the protective plate 45 is not illustrated due to the viewpoint of the perspective view.

The first upper reinforcing member 50 is installed between the battery module 36 and the battery modules 41, particularly between the battery stack 37 and the battery stack 43. The front end of the first upper reinforcing member 50 is connected to the front reinforcement frame 32, and the rear end of the first upper reinforcing member 50 is connected to the rear reinforcement frame 33. Also, a second upper reinforcing member 51 is fixed to the lower surface of the first upper reinforcing member 50. The configuration will be described later.

Figure 3:
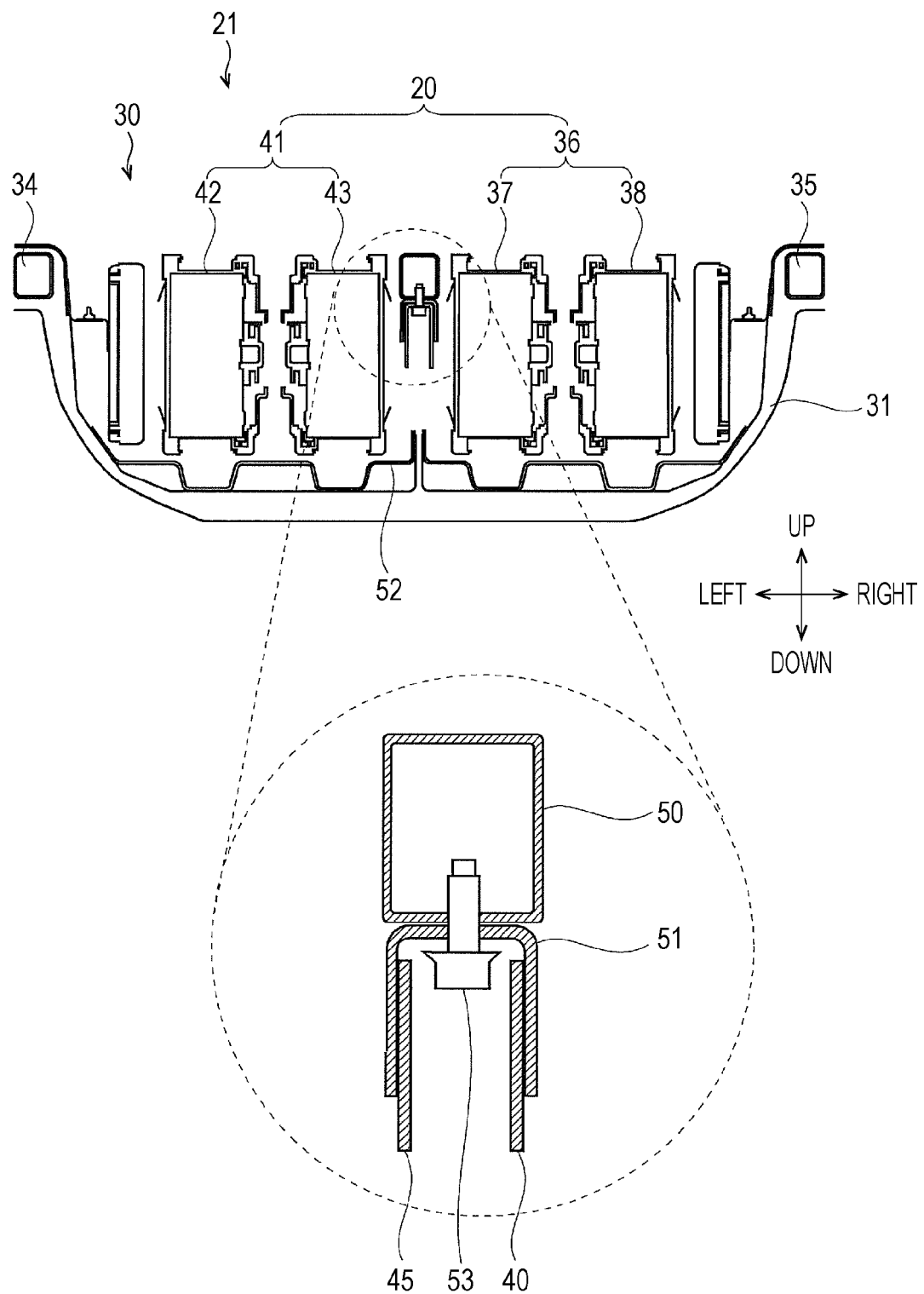
FIG. 3 is a cross-sectional view illustrating the vehicle battery pack protective structure according to the example of the present invention.

The vehicle battery pack protective structure 21, which stores the vehicle battery pack 20, will be further described with reference to FIG. 3. FIG. 3 is a cross-sectional view taken along a line III-III of FIG. 2.

As described above, in the storage container 31, the battery module 36 including the battery stack 37 and the battery stack 38 and the battery module 41 including the battery stack 42 and the battery stack 43 are stored from the right to the left. Also, a lower reinforcement member 52 is disposed near the bottom surface of the storage container 31. The lower reinforcement member 52 is made of a steel plate which is formed in a meandering shape in the right-left direction. The mechanical strength of the lower part of the battery pack storage container 30 in the front-rear direction can be increased by disposing the lower reinforcement member 52 near the bottom surface of the storage container 31.

The first upper reinforcing member 50 is a rectangular steel pipe having a closed cross-section in a substantially rectangular shape. The mechanical strength of the upper part of the battery pack storage container 30 in the front-rear direction can be increased by forming the first upper reinforcing member 50 using a rectangular steel pipe having a high mechanical strength.

The first upper reinforcing member 50 is disposed at the upper end or in the vicinity of the upper end of the battery stack 37. Specifically, the upper end of the first upper reinforcing member 50 is disposed at the same height as or lower than the upper end of the battery stack 37. In this manner, the first upper reinforcing member 50 does not project upward, and a larger storage space 14 above the rear floor 13 illustrated in FIG. 1 can be ensured.

The second upper reinforcing member 51 is mounted on the lower surface of the first upper reinforcing member 50. The second upper reinforcing member 51 is channel steel which is opened downward. The upper surface of the second upper reinforcing member 51 is in intimate contact with the lower surface of the first upper reinforcing member 50. The second upper reinforcing member 51 and the first upper reinforcing member 50 are fixed by a bolt 53 which is a fastener and penetrates the upper surface of the second upper reinforcing member 51 and the lower surface of the first upper reinforcing member 50.

The protective plate 40 and the protective plate 45 are disposed inside the second upper reinforcing member 51. Specifically, the upper portions of the protective plate 40 and the protective plate 45 are inserted in the second upper reinforcing member 51. Here, the protective plate 40 and the protective plate 45 may be in intimate contact with or separated from the inner surface of the second upper reinforcing member 51. In this manner, when a vehicle collision occurs, the second upper reinforcing member 51 serves as a guide as described later, and similarly to the first upper reinforcing member 50, the protective plate 40 and the protective plate 45 can be bent and deformed upward. Therefore, at the time of a collision, the protective plate 45 is not bent to the left toward the battery stack 43, thus the battery stack 43 can be prevented from being damaged. Similarly, the protective plate 40 is not bent to the right toward the battery stack 37, thus the battery stack 37 can be prevented from being damaged.

Figure 4A:
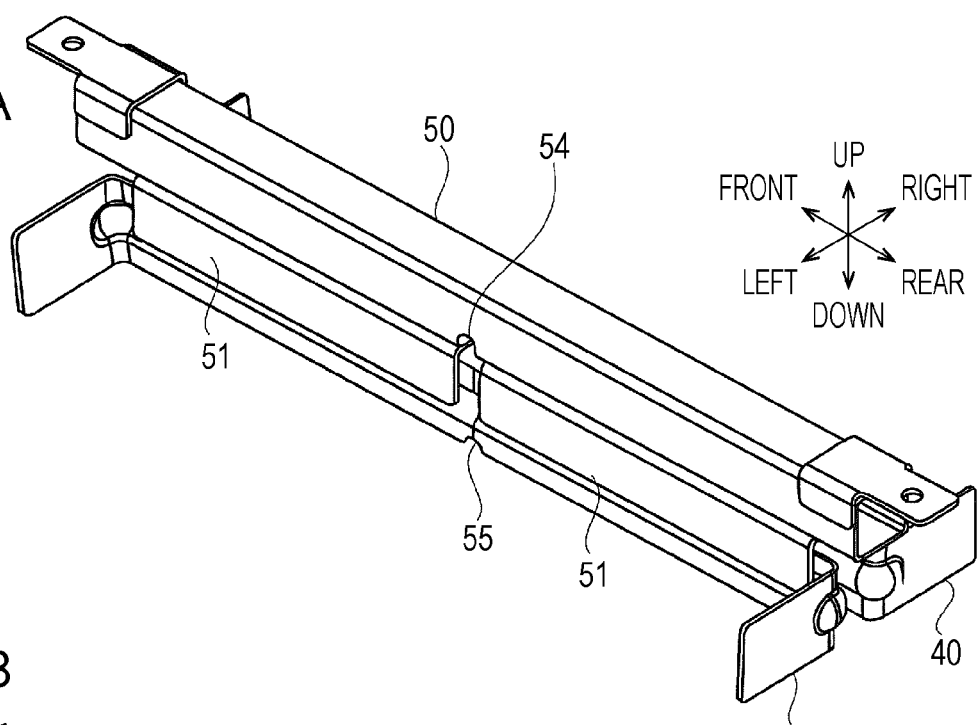
FIGS. 4A and 4B are views illustrating the vehicle battery pack protective structure according to the example of the present invention.

The first upper reinforcing member 50 and other members will be further described with reference to the perspective view of FIGS. 4A and 4B. FIG. 4A is a perspective view illustrating the first upper reinforcing member 50, the second upper reinforcing member 51, and the protective plate 45, and FIG. 4B is an exploded perspective view illustrating these members separated in the upper-lower direction.

Figure 4B:
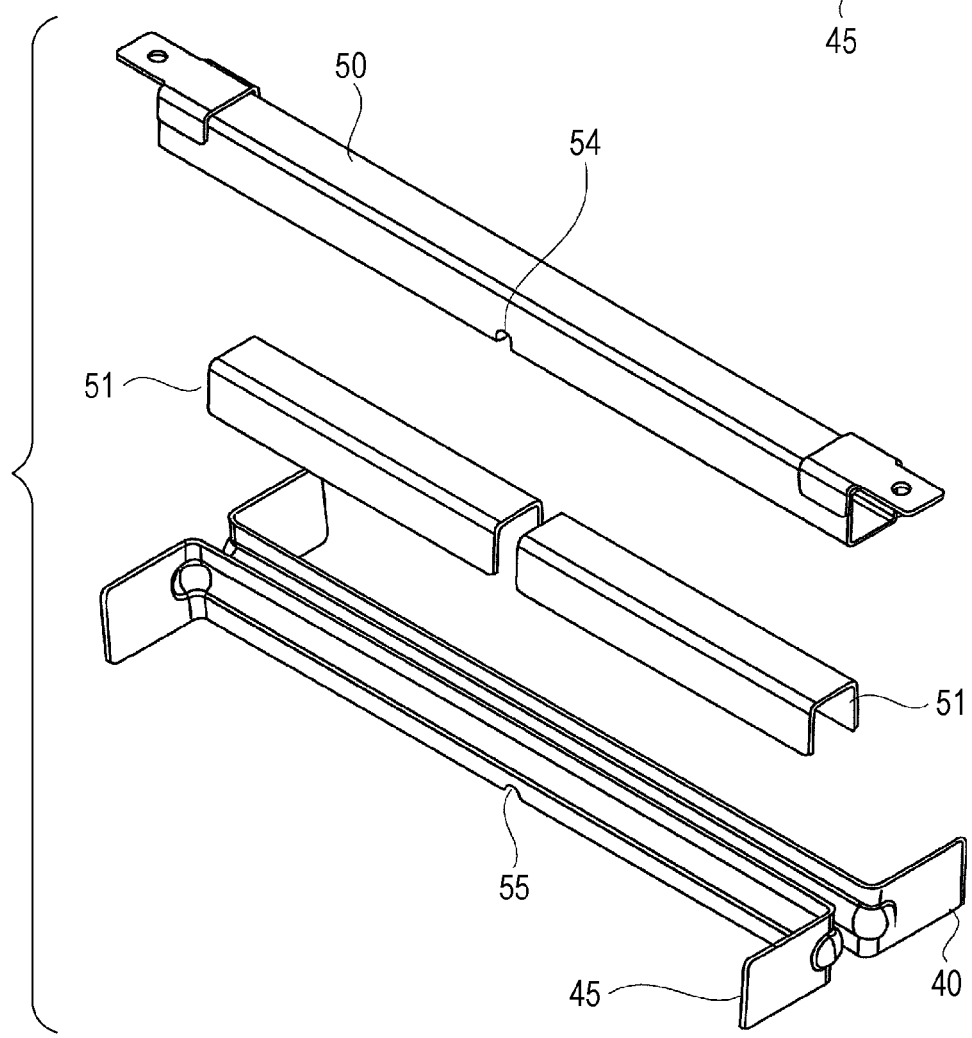

Referring to FIGS. 4A and 4B, as mentioned above, the second upper reinforcing member 51 is mounted on the lower surface of the first upper reinforcing member 50. Here, two second upper reinforcing members 51 are mounted at a front position and a rear position, respectively, of the first upper reinforcing member 50. In other words, the second upper reinforcing members 51 are separated near a central portion of the first upper reinforcing member 50 in the front-rear direction. In this manner, at the time of a collision, the first upper reinforcing member 50 can be deformed so that the central portion is raised upward.

A first fragile part 54 is formed by cutting out a lower portion of a substantially central portion of the first upper reinforcing member 50 in the front-rear direction. The first fragile part 54 is a slit obtained by partially cutting the first upper reinforcing member 50. Since the first upper reinforcing member 50 is a rectangular steel pipe as described above, the cross-section has a lower-side section, an upper-side section, a left-side section, and a right-side section. In the cross-section of a portion where the first fragile part 54 is formed, the lower-side section is entirely cut out, and the vicinity of the lower ends of the left-side section and the right-side section is also cut out. When seen from the left, the first fragile part 54 is substantially semi-circle shaped, for instance.

In this manner, the first upper reinforcing member 50 at the portion where the first fragile part 54 is formed can be made more fragile than the first upper reinforcing member 50 at other portions. Thus, when a collision, which disperses impact energy in the front-rear direction, occurs, the first upper reinforcing member 50 can be bent around a bending start point so as to be raised upward, the bending start point being the portion where the first fragile part 54 is formed.

Also, the second upper reinforcing member 51 is not disposed below the portion where the first fragile part 54 of the first upper reinforcing member 50 is formed. In other words, the second upper reinforcing members 51 are separated at the portion where the first fragile part 54 is formed. In this manner, the strength of the portion where the first fragile part 54 is formed can be made relatively smaller than the strength of other portions, and it is possible to achieve a significant effect of bending the first upper reinforcing member 50 upward around the first fragile part 54 as the bending start point.

A second fragile part 55 is formed by cutting out a lower portion of a substantially central portion of the protective plate 45 in the front-rear direction. In this manner, the strength of the substantially central portion of the protective plate 45 is made smaller than the strength of other portions. Also, the second fragile part 55 is formed below the first fragile part 54 described above. Therefore, when a collision occurs, the protective plate 45 is bent around the substantially central portion as the bending start point so as to form an upward projection shape. Similarly to the protective plate 45, the second fragile part 55 is formed in the protective plate 40.

Figure 5:
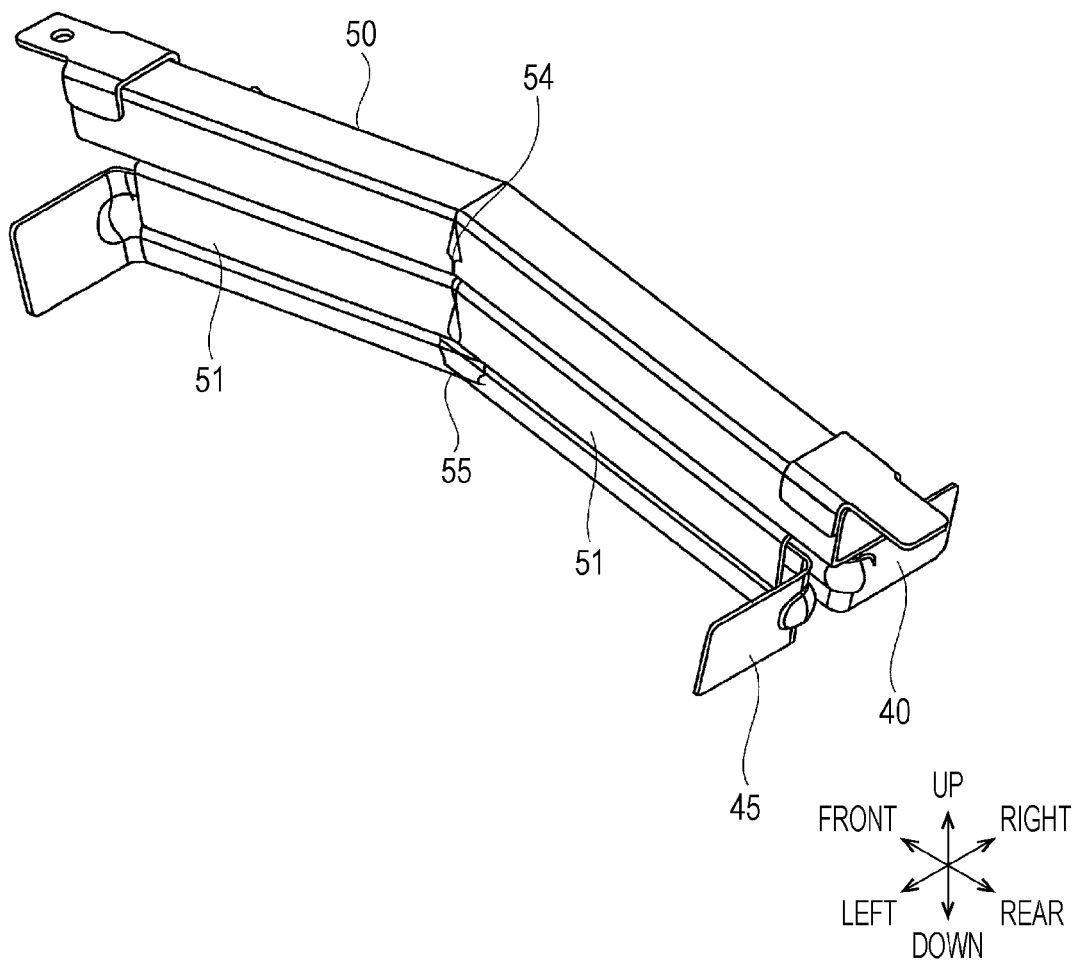
FIG. 5 is a view illustrating the vehicle battery pack protective structure according to the example of the present invention, specifically a perspective view illustrating the reinforcement members which are deformed when a collision occurs.

FIG. 5 illustrates the first upper reinforcing member 50 and other members which are deformed by a collision. Due to collision energy applied in the front-rear direction, the first upper reinforcing member 50 is bent and deformed around the first fragile part 54 as the bending start point so as to form an upward projection. The collision energy is absorbed by bending and deformation of the first upper reinforcing member 50, and thus deformation of the battery pack storage container 30 and the vehicle battery pack 20 illustrated in FIG. 2 can be reduced. Particularly, referring to FIG. 1, when a collision such as a collision of the rear of the vehicle 10 with an external object occurs, it is not possible to absorb the collision energy by the side frames of the vehicle. Since the first upper reinforcing member 50 is disposed at a substantially central portion of the vehicle 10 in this example, even when such as a collision occurs, it is possible to absorb the collision energy by the first upper reinforcing member 50, and damage and ignition of the vehicle battery pack 20 can be prevented.

Referring to FIG. 3, at the time of a collision, the first upper reinforcing member 50 is deformed in a direction away from the battery stack 43, thus it is possible to prevent the battery stack 43 and other members from being destroyed by the first upper reinforcing member 50 deformed by the collision. At this time, the second upper reinforcing member 51 is not significantly deformed, and basically maintains a straight shape.

At the time of a collision, the protective plates 40, 45 are also bent and deformed around the second fragile part 55 as the bending start point so as to form an upward projection. Also, as illustrated in FIG. 3, the protective plates 40, 45 are guided by the second upper reinforcing member 51 in the right-left direction. Therefore, at the time of a collision, the protective plates 40, 45 are bent and deformed upward without being bent to the left direction or the right direction. Thus, referring to FIG. 3, it is possible to prevent the battery stacks 43, 37 from being destroyed by the protective plates 40, 45 deformed by the collision.

The example provides a vehicle battery pack protective structure which protects a vehicle battery pack 20 including a plurality of battery stacks 37 disposed in a width direction of a vehicle, the structure including: a battery pack storage container 30 that stores the vehicle battery pack 20; and a first upper reinforcing member 50 that extends in a front-rear direction of the vehicle between the plurality of battery stacks 37, and is connected to the battery pack storage container 30 at a front end and a rear end. A first fragile part 54 is formed below an intermediate position of the first the upper reinforcing member 50. Thus, since the first upper reinforcing member 50 is provided, even when a collision occurs, the first upper reinforcing member 50 absorbs the impact of the collision, and it is possible to prevent the vehicle battery pack 20 from being damaged. Also, when higher collision energy is applied to the vehicle, the first upper reinforcing member 50 is bent so as to form an upward projection because the first upper reinforcing member 50 has the fragile part below an intermediate position thereof. In other words, the first upper reinforcing member 50 is deformed so as to be moved away from the vehicle battery pack. Therefore, at the occurrence of a collision, it is possible to prevent the vehicle battery pack 20 from being damaged by the deformed first upper reinforcing member 50.

In addition, in the vehicle battery pack protective structure according to the example, the first upper reinforcing member 50 is disposed at a height substantially equal to the height of the upper end of the vehicle battery pack 20. Consequently, at a normal time when no collision occurs, upward projection of the first upper reinforcing member 50 is avoided, and a larger space formed above can be ensured.

In addition, in the vehicle battery pack protective structure according to the example of the present invention, the second upper reinforcing member 51 is connected to the lower surface of the first upper reinforcing member 50, and the second upper reinforcing member is not provided in a portion, of the first upper reinforcing member 50, in which the first fragile part is formed. Therefore, the first upper reinforcing member can be reinforced by connecting the second upper reinforcing member to the lower surface of the first upper reinforcing member. Furthermore, since the second upper reinforcing member is not provided in the portion, of the first upper reinforcing member, in which the first fragile part is formed, when a collision occurs, the first upper reinforcing member 50 can be reliably bent at the portion in which the first fragile part is formed.

Furthermore, in the vehicle battery pack protective structure according to the example, the first the upper reinforcing member 50 is a rectangular steel pipe, and the second upper reinforcing member 51 is a channel steel which is opened in a direction away from the first upper reinforcing member 50. Thus, the first upper reinforcing member 50 is formed of a rectangular steel pipe having a high mechanical strength, and the vehicle battery pack 20 can be effectively protected at the time of a collision. Since the second upper reinforcing member 51 is a channel steel, it is possible to absorb the impact at the time of a collision by deformation as well as to promote the above-described deformation.

Furthermore, in the vehicle battery pack protective structure according to the example, the protective plates 40, 45 are disposed between the battery stacks 43, 37, and the protective plates 40, 45 are disposed in the opening of the second upper reinforcing member 51. Therefore, when a collision occurs, the protective plates 40, 45 along with the first upper reinforcing member 51 can be deformed, and it is possible to effectively absorb collision energy and to protect the vehicle battery pack 20 further effectively.

Furthermore, in the vehicle battery pack protective structure according to the example, the second fragile part 55 is formed in the protective plates 40, 45, in the vicinity of the first fragile part 54 of the first upper reinforcing member 50. Therefore, when a collision occurs, the first upper reinforcing member 50 and the protective plates 40, 45 are bent at the same position in the front-rear direction, and the first upper reinforcing member 50 and the protective plates 40, 45 are moved away from the vehicle battery pack 20. Thus, it is possible to protect the vehicle battery pack 20.

Furthermore, in the vehicle battery pack protective structure according to the example, a plurality of protective plates 40, 45 are disposed between the battery stacks 43, 37. Since the plurality of protective plates 40, 45 are disposed, it is possible to absorb more collision energy.

Furthermore, in the vehicle battery pack protective structure according to the example, the battery pack storage container 30 includes the front reinforcement frame 32 at the front end and the rear reinforcement frame 33 at the rear end, the front reinforcement frame 32 and the rear reinforcement frame 33 extending in a width direction, and the front end of the first upper reinforcing member 50 is connected to the front reinforcement frame 32, and the rear end of the first upper reinforcing member is connected to the rear reinforcement frame 33. Since the front end and the rear end of the first the upper reinforcing member 50 are connected to the front reinforcement frame 32 and the rear reinforcement frame 33, respectively, when a collision occurs, it is possible to effectively protect the vehicle battery pack 20 by these members.

Furthermore, the vehicle 10 according to the example has the vehicle battery pack protective structure. Therefore, since the vehicle has the vehicle battery pack protective structure in which collision countermeasures are taken, the safety of the vehicle at the time of a collision can be improved.

Although the example according to the present invention has been described above, the present invention is not limited to this, and modifications may be made within the scope not departing from the spirit of the present invention.

The invention claimed is:

1. A vehicle battery pack protective structure which protects a vehicle battery pack including a plurality of battery stacks disposed in a width direction of a vehicle, the vehicle battery pack protective structure comprising:
   a battery pack storage container that stores the vehicle battery pack; and
   a first upper reinforcing member that extends in a front-rear direction of the vehicle between the battery stacks, and is connected to the battery pack storage container at a front end and a rear end,
   wherein a first fragile part is formed below an intermediate position of the first upper reinforcing member, and
   wherein the first upper reinforcing member is disposed at a height substantially equal to a height of an upper end of the vehicle battery pack.

2. The vehicle battery pack protective structure according to claim 1, further comprising:
   a second upper reinforcing member connected to a lower surface of the first upper reinforcing member,
   wherein the second upper reinforcing member is not provided in a portion, of the first upper reinforcing member, in which the first fragile part is formed.

3. The vehicle battery pack protective structure according to claim 2, wherein the first upper reinforcing member includes a rectangular steel pipe, and the second upper reinforcing member includes a channel steel which is opened in a direction away from the first upper reinforcing member.

4. The vehicle battery pack protective structure according to claim 3, wherein a protective plate is disposed between the battery stacks, and
   wherein the protective plate is disposed in an opening of the second upper reinforcing member.

5. The vehicle battery pack protective structure according to claim 4, wherein a second fragile part is formed in the protective plate, in a vicinity of the first fragile part of the first upper reinforcing member.

6. The vehicle battery pack protective structure according to claim 1, wherein the battery pack storage container comprises a front reinforcement frame at a front end and a rear reinforcement frame at a rear end, the front reinforcement frame and the rear reinforcement frame extending in the width direction, and
   wherein the front end of the first upper reinforcing member is connected to the front reinforcement frame, and the rear end of the first upper reinforcing member is connected to the rear reinforcement frame.

7. A vehicle comprising the vehicle battery pack protective structure according to claim 1.

8. A vehicle comprising the vehicle battery pack protective structure according to claim 2.

9. A vehicle comprising the vehicle battery pack protective structure according to claim 3.

10. A vehicle battery pack protective structure which protects a vehicle battery pack including a plurality of battery stacks disposed in a width direction of a vehicle, the vehicle battery pack protective structure comprising:

a battery pack storage container that stores the vehicle battery pack;

a first upper reinforcing member that extends in a front-rear direction of the vehicle between the battery stacks, and is connected to the battery pack storage container at a front end and a rear end; and a second upper reinforcing member connected to a lower surface of the first upper reinforcing member, wherein a first fragile part is formed below an intermediate position of the first upper reinforcing member, and wherein the second upper reinforcing member is not provided in a portion, of the first upper reinforcing member, in which the first fragile part is formed.

11. The vehicle battery pack protective structure according to claim 10, wherein the first upper reinforcing member includes a rectangular steel pipe, and the second upper reinforcing member includes a channel steel which is opened in a direction away from the first upper reinforcing member.

12. The vehicle battery pack protective structure according to claim 11, wherein a protective plate is disposed between the battery stacks, and wherein the protective plate is disposed in an opening of the second upper reinforcing member.

13. The vehicle battery pack protective structure according to claim 12, wherein a second fragile part is formed in the protective plate, in a vicinity of the first fragile part of the first upper reinforcing member.

14. The vehicle battery pack protective structure according to claim 12, wherein a plurality of protective plates, each of which including the protective plate, are disposed between the battery stacks.

15. The vehicle battery pack protective structure according to claim 13, wherein a plurality of protective plates, each of which including the protective plate, are disposed between the battery stacks.

16. A vehicle comprising the vehicle battery pack protective structure according to claim 10.

17. A vehicle comprising the vehicle battery pack protective structure according to claim 11.

18. A vehicle battery pack protective structure which protects a vehicle battery pack including a plurality of battery stacks disposed in a width direction of a vehicle, the vehicle battery pack protective structure comprising:

a battery pack storage container that stores the vehicle battery pack; and a first upper reinforcing member that extends in a front-rear direction of the vehicle between the battery stacks, and is connected to the battery pack storage container at a front end and a rear end, wherein a first fragile part is formed below an intermediate position of the first upper reinforcing member, wherein the battery pack storage container comprises a front reinforcement frame at a front end and a rear reinforcement frame at a rear end, the front reinforcement frame and the rear reinforcement frame extending in the width direction, and wherein the front end of the first upper reinforcing member is connected to the front reinforcement frame, and the rear end of the first upper reinforcing member is connected to the rear reinforcement frame.

* * * * *